United States Patent Office 3,197,414
Patented July 27, 1965

3,197,414
TETRAETHYLLEAD-TETRAMETHYLLEAD
ANTIKNOCK FLUIDS
James M. Wood, Jr., Baton Rouge, La., assignor to Ethyl Corporation, New York, N.Y., a corporation of Virginia
No Drawing. Filed June 26, 1961, Ser. No. 119,294
6 Claims. (Cl. 252—386)

My object is to effectively inhibit redistribution reactions which occur during storage of certain alkyllead antiknock fluid compositions.

It has been discovered heretofore that certain mixtures of alkyllead antiknock agents—e.g. tetraethyllead plus tetramethyllead in various proportions—very effectively improve the antiknock quality of certain modern gasolines. However, concentrated antiknock fluid compositions composed initially of tetraethyllead and tetramethyllead tend to redistribute during storage, even at room temperatures. The result of such redistribution is the formation in the antiknock fluid composition of redistribution mixtures of tetraalkyllead antiknock compounds —e.g. mixtures of tetraethyllead, triethylmethyllead, diethyldimethyllead, ethyltrimethyllead and tetramethyllead in various proportions. Such redistributed mixtures are oftentimes less desirable as antiknock agents than the initial mixtures consisting essentially of the tetraethyllead and the tetramethyllead.

I have found that trimethylphosphate, a very effective and useful antiknock fluid ingredient, e.g. as a pre-ignition suppressor, an alkyllead thermal stabilizer ingredient, etc., tends to accelerate the foregoing redistribution reactions during the storage period. In short, trimethylphosphate acts as a redistribution accelerator.

Hence a need has arisen for an effective means of overcoming this accelerated redistribution.

I have found that cyclopentadienyl manganese tricarbonyl compounds have the property of effectively combating the redistribution reactions which would otherwise occur when tetraethyllead-tetramethyllead antiknock fluids containing trimethylphosphate are subjected to storage. My invention in part, then, is my discovery that these cyclopentadienyl manganese tricarbonyl compounds have a new property and a new use in a new environment.

Provided by this invention is an antiknock fluid composition which consists essentially of
 (1) A mixture of tetraethyllead and tetramethyllead, from about 10 to about 90 mole percent of this mixture being tetraethyllead,
 (2) Trimethylphosphate present in amount such that the phosphorus to lead atom ratio is from about 0.1:3 to about 2:3, and
 (3) A cyclopentadienyl manganese tricarbonyl compound present in amount such that the weight ratio of manganese to lead is from about 0.005:1 to about 0.5:1.

The cyclopentadienyl manganese tricarbonyl compounds used in this invention are now well known compounds (see U.S. Patents 2,818,416 and 2,818,417). Thus effective use can be made of cyclopentadienyl manganese tricarbonyl, methylcyclopentadienyl manganese tricarbonyl, ethylcyclopentadienyl manganese tricarbonyl, tert-butylcyclopentadienyl manganese tricarbonyl, dimethylcyclopentadienyl manganese tricarbonyl, indenyl manganese tricarbonyl, and related compounds in which the cyclopentadienyl hydrocarbon group preferably contains from 5 to about 17 carbon atoms. From a cost effectivness standpoint methylcyclopentadienyl manganese tricarbonyl is particularly preferred. Cyclopentadienyl manganese tricarbonyl is also a highly efficient additive for this invention.

To illustrate the practice and advantages of this invention a series of storage tests was conducted. Antiknock fluid compositions containing in all cases a mixture of 50 mole percent of tetraethyllead and 50 mole percent of tetramethyllead were formulated. In one instance trimethylphosphate was co-present in amount such that the phosphorus to lead atom ratio was 0.8:3. In another instance methylcyclopentadienyl manganese tricarbonyl was present in amount such that the weight ratio of manganese to lead was 0.04:1. The illustrative composition of this invention contained both the trimethylphosphate and the methylcyclopentadienyl manganese tricarbonyl ingredients in the proportions just described, the resulting antiknock fluid composition having density of 1.473. Each of these formulations was then stored for a period of 216 days at ambient conditions (approximate mean temperature: 26° C.). Periodically the formulations were subjected to standard chemical analyses to determine the extent to which redistribution had occurred. This involved the determination of the rate at which triethylmethyllead—one of the initial redistribution products—had been formed once the induction period had been passed. For this purpose, standardized vapor phase chromatographic methods were employed. The results of these tests are shown in the table.

Table.—Rates of redistribution in antiknock fluid mixtures

| Run No. | Additive | Rate of Redistribution | |
|---|---|---|---|
| | | Triethylmethyllead formation, mole percent/mo.[1] | Tetramethyllead consumed, wt. percent/mo. |
| 1 | None | 0.43 | 0.86 |
| 2 | Trimethylphosphate | 1.0 | 2.0 |
| 3 | Methylcyclopentadienyl manganese tricarbonyl | 0.36 | 0.72 |
| 4 | Trimethylphosphate+methylcyclopentadienyl manganese tricarbonyl | 0.27 | 0.54 |

[1] Relative to the total lead compounds present.

It will be noted that the rates of redistribution are expressed in several ways in the above Table. However, in all cases the lower the number the lower the extent of redistribution. Accordingly, it will be seen by comparing Run 2 with Run 1 that trimethylphosphate tended to significantly increase the rate of redistribution. However, as seen from Run 4 the presence of a cyclopentadienyl manganese tricarbonyl compound in a trimethylphosphate-containing antiknock fluid not only effectively squelched the adverse catalytic effect of the trimethylphosphate but actually suppressed the redistribution rate to a level below that occurring in any of the other systems tested.

Very similar results are achieved when using other compositions of this invention. Examples of these are
 (I) 10 mole percent of tetraethyllead plus 90 mole percent of tetramethyllead, trimethylphosphate (P:Pb atom ratio=0.2:3) and methyl-tert-butylcyclopentadienyl manganese tricarbonyl (weight ratio, Mn:Pb=0.5:1);
 (II) 90 mole percent of tetraethyllead plus 10 mole percent of tetramethyllead, trimethylphosphate (P:Pb atom ratio=1.5:3) and octylcyclopentadienyl manganese tricarbonyl (weight ratio, Mn:Pb=0.01:1);
 (III) 20 mole percent of tetraethyllead plus 80 mole percent of tetramethyllead, trimethylphosphate (P:Pb atom ratio=0.4:3) and cyclopentadienyl manganese tricarbonyl (weight ratio, Mn:Pb=0.02:1);
 (IV) 70 mole percent of tetraethyllead plus 30 mole percent of tetramethyllead, trimethylphosphate (P:Pb atom ratio=1:3) and indenyl manganese tricarbonyl (weight ratio, Mn:Pb=0.1:1); and the like.

The compositions of this invention can contain known amounts of other additives such as dyes for identification purposes, antioxidants (e.g. 2,6-di-tert-butyl phenol, 2,4,6-tri-tert-butyl phenol, 4-methyl-2,6-di-tert-butyl phenol, etc.), inert diluents (e.g. kerosene, etc.), rust inhibitors, anti-icing additives, metal deactivators, alkyllead thermal stabilizers, and the like. Organic halide scavengers can be used with advantage in the compositions of this invention. For example my compositions can contain such scavenger compounds as are described in U.S. Patents 1,592,954; 1,668,022; 2,364,921; 2,398,281; 2,479,900–903; 2,496,983; 2,661,379; 2,849,302–304; 2,869,993; 2,822,252; etc. The concentrations and proportions of such scavengers are well known in the art as witness the foregoing patents.

What is claimed is:
1. An antiknock fluid composition which consists essentially of
   (1) An alkyllead mixture consisting of tetraethyllead and tetramethyllead, from about 10 to about 90 mole percent of this mixture being tetraethyllead,
   (2) Trimethylphosphate present in amount such that the phosphorus to lead atom ratio is from about 0.1:3 to about 2:3, and
   (3) A cyclopentadienyl manganese tricarbonyl compound present in amount such that the weight ratio of manganese to lead is from about 0.005:1 to about 0.5:1.

2. The antiknock fluid composition of claim 1 wherein cyclopentadienyl manganese tricarbonyl compound is methylcyclopentadienyl manganese tricarbonyl.

3. The antiknock fluid composition of claim 1 wherein said cyclopentadienyl manganese tricarbonyl compound is cyclopentadienyl manganese tricarbonyl.

4. The antiknock fluid composition of claim 1 wherein said mixture of tetraethyllead and tetramethyllead is a mixture of 50 mole percent of tetraethyllead and 50 mole percent of tetramethyllead.

5. The antiknock fluid composition of claim 1 wherein said mixture of tetraethyllead and tetramethyllead is a mixture of 50 mole percent of tetraethyllead and 50 mole percent of tetramethyllead and wherein said cyclopentadienyl manganese tricarbonyl compound is methyl cyclopentadienyl manganese tricarbonyl.

6. The antiknock fluid composition of claim 1 wherein said mixture of tetraethyllead and tetramethyllead is a mixture of 50 mole percent of tetraethyllead and 50 mole percent of tetramethyllead and wherein said cyclopentadienyl manganese tricarbonyl compound is cyclopentadienyl manganese tricarbonyl.

References Cited by the Examiner
UNITED STATES PATENTS

| | | | |
|---|---|---|---|
| 2,304,883 | 12/42 | Campbell | 44—69 |
| 2,818,417 | 12/57 | Brown et al. | 44—68 |
| 3,021,350 | 2/62 | Cook et al. | 260—437 |

DANIEL E. WYMAN, *Primary Examiner.*